June 30, 1959 H. G. McCARTY 2,892,351
CONTROL MECHANISM
Filed April 25, 1958 2 Sheets-Sheet 1
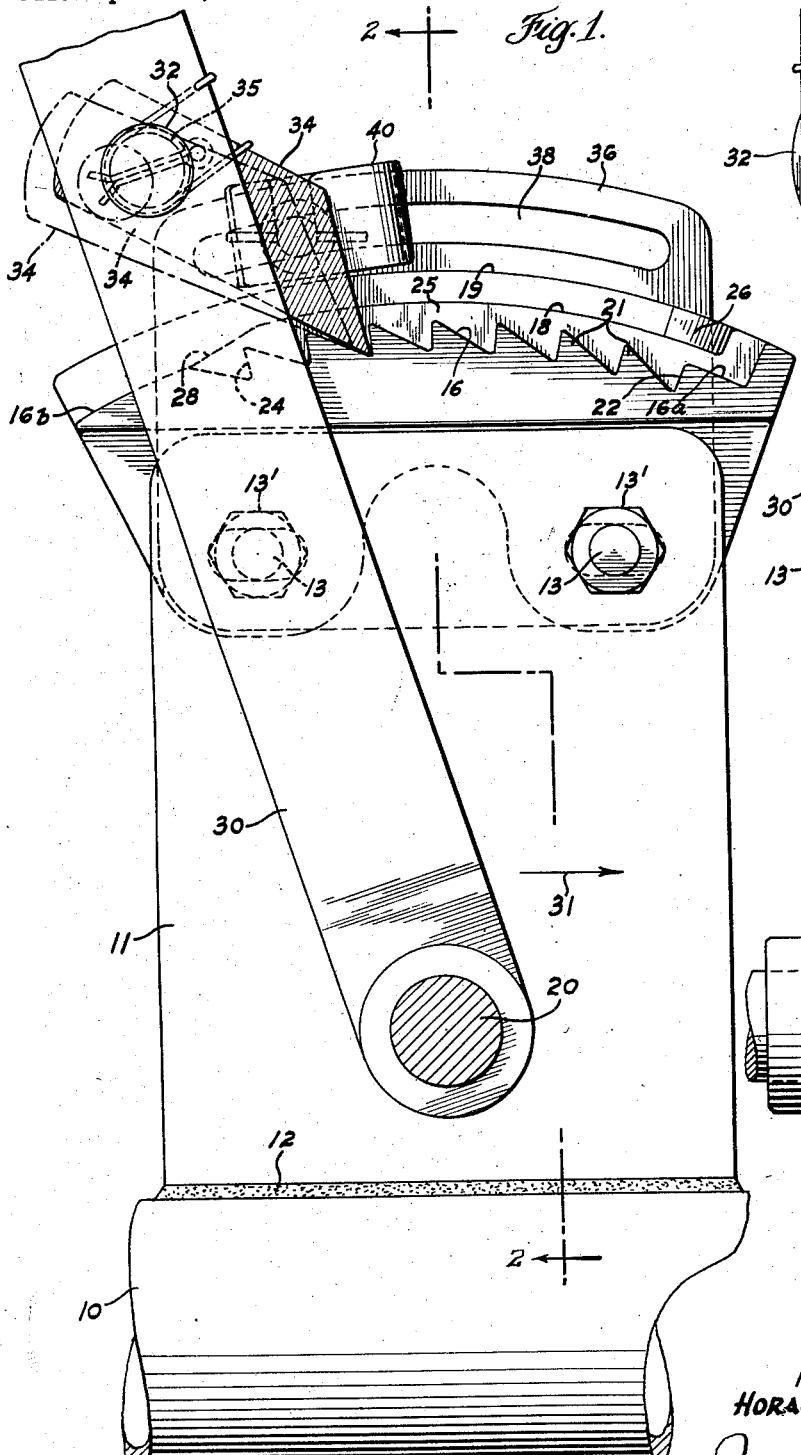
INVENTOR
HORACE G. McCARTY
BY Joseph Allen Brown
ATTORNEY June 30, 1959  H. G. McCARTY  2,892,351
CONTROL MECHANISM
Filed April 25, 1958  2 Sheets-Sheet 2
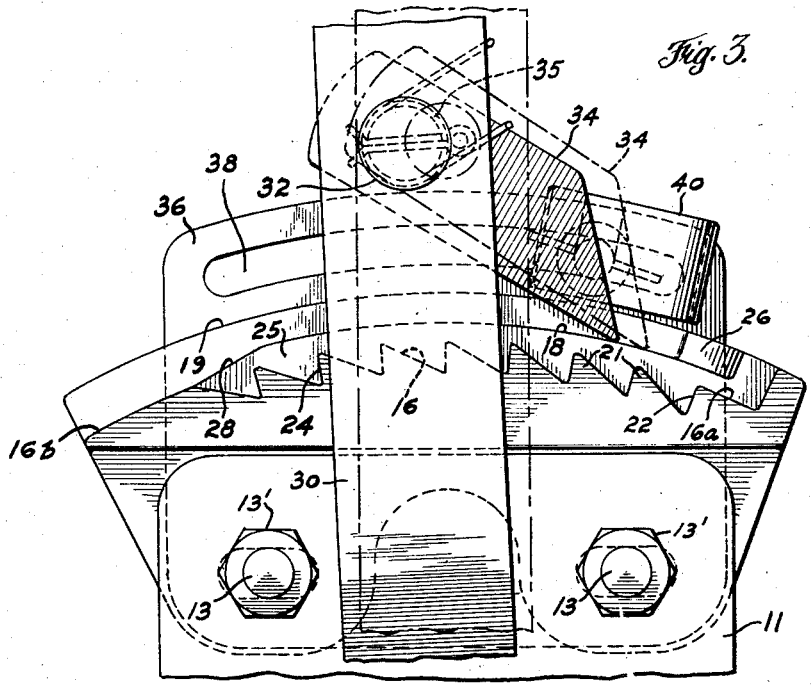
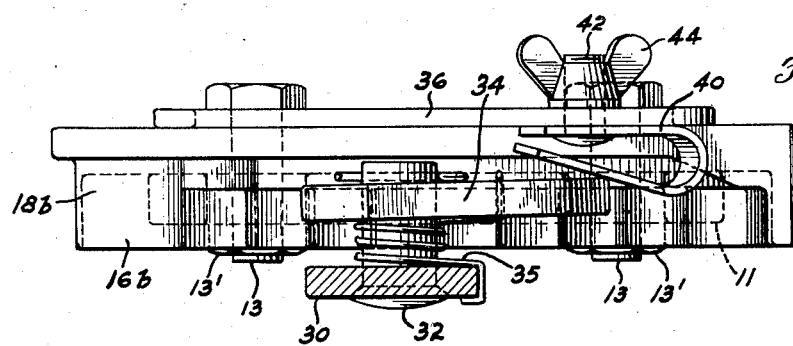
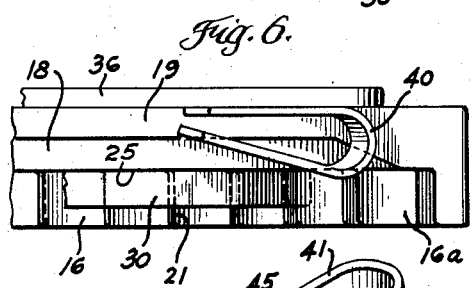
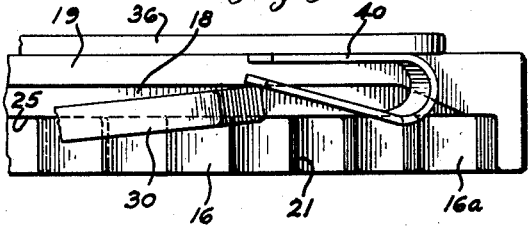
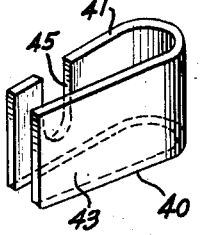
INVENTOR
HORACE G. McCARTY
BY Joseph Allen Brown
ATTORNEY

United States Patent Office 2,892,351
Patented June 30, 1959

2,892,351

CONTROL MECHANISM

Horace G. McCarty, New Holland, Pa., assignor to Sperry Rand Corporation, New Holland, Pa., a corporation of Delaware Application April 25, 1958, Serial No. 730,926

7 Claims. (Cl. 74—17.5)

The present invention relates to mechanical control mechanisms and more particularly to an improvement in the control mechanism shown and described in U.S. Patent No. 2,826,933.

The mechanism in such patent includes a control track having a series of stops thereon in the form of ratchet teeth extending from a forward end of the track to a rear end thereof. A pawl carried on a control lever is movable rearwardly over the track. The engagement of the pawl with a given ratchet tooth results in the control lever being held in a given control position. Through a suitable connection between the lever and some mechanism to be controlled, the operation of such mechanism may be varied.

When the pawl reaches the rear end of the control track it is shiftable laterally and out of engagement with the track whereby the control lever and the pawl may move alongside the control track and back towards the forward end thereof. When the pawl reaches the forward end, it is shiftable back onto the control track, to a starting position thereon.

Such mechanism has been successfully employed to control the raising and lowering of the pickup of a hay crusher, and for regulating the spacing of the pickup relative to the ground. The number of stops or teeth on the control track is variable, as desired. For example, a control track having five teeth or stops might be employed. When the pawl of the device is in engagement with the first tooth, the pickup is only slightly spaced from the ground. At tooth two, the pickup is an inch higher, and so on until the fifth tooth is engaged by the pawl, at which point the pickup is five inches higher than it was at tooth one. Starting at tooth one, the operator can set the pickup at any tooth from one to five and thereby vary the height of the pickup a range of five inches. However, assume that the operator has set the device at tooth four and decides that a change in crop conditions requires that the pickup be set lower, for example, tooth two. To reset the device, he must first move the pawl past tooth five so that the pawl may be shifted laterally. Thereafter, the pawl and control arm may move back to the forward end of the control track and starting position. The operator then indexes the device rearwardly to move the pawl to the desired position, or tooth two, whereupon the proper positioning of the pickup is achieved.

The fact that the device has to go all the way back to starting position each time it is reset to a lower range creates problems in some instances. For example, an operator of a crusher, the pickup of which is raised and/or lowered by the control device, might decide that the pickup should be set at tooth three because of some field condition, such as high spots. If the operator is moving over the field and comes to a rock he will want to raise the pickup to pass over the rock and then set the pickup back at tooth three. To do this he must drop the pickup all the way down to starting position and then back up to three. If he does such resetting while the crusher is moving, the pickup when it drops all the way down and before it is raised to the appropriate height, may hit one of the high spots prevalent and "bulldoze," causing considerable damage to the pickup. The safe thing for the operator to do is stop the crusher when he resets the height of the pickup. However, stopping wastes time. Crop and field conditions may vary considerably in a given field and the operator may find it desirable to reset the height of the pickup frequently in one crop treating operation in one field. If he has to stop the crusher everytime he resets the pickup, the total of lost time may be substantial.

A main object of this invention is to provide a control mechanism of the character described having means thereon whereby the lower limit or setting of the mechanism may be selectively varied.

Another object of this invention is to provide selectively positionable means of the character described which is of simple construction and low cost.

Other objects of this invention will be apparent hereinafter from the specification and from the recital in the appended claims.

In the drawings:

Fig. 1 is a fragmentary side elevation of a control mechanism of the character described having improved means constructed according to this invention for varying the lower limit of operation of the device;

Fig. 2 is a fragmentary section taken on the line 2—2 of Fig. 1 and looking in the direction of the arrows;

Fig. 3 is a fragmentary side elevation similar to Fig. 1 but showing the means of this invention in a different position;

Fig. 4 is a plan view of Fig. 3 showing a control pawl of the mechanism in a given position;

Fig. 5 is a fragmentary view similar to Fig. 4, with certain of the parts removed, and showing the pawl in another operative position;

Fig. 6 is a view similar to Fig. 5 showing a still further position of the pawl; and Fig. 7 is a perspective view of one part of means of this invention.

Referring now to the drawings by numerals of reference, and particularly to Figs. 1 and 2, 10 indicates a horizontal support pipe. Mounted on pipe 10 and extending vertically relative thereto is a support plate 11 the lower end of which is connected to the pipe by welding 12. Affixed by a pair of nuts 13 and bolts 13' to one side wall 14 of plate 11 is a body member 15 of cast metal or the like which extends upwardly and above the top of plate 11.

At its upper edge, body member 15 is formed to define three parallel preferably arcuate tracks, namely, a control track 16, a return track 18 and a guide track 19. It will be noted that return track 18 is spaced vertically relative to the control track 16. Also, the guide track is spaced vertically relative to the control and return tracks. Each track is concentric about a common axis of curvature defined by a pivot pin 20 projecting laterally from and supported on plate 11. The control, return and guide tracks are in axially adjoining relation to each other.

Control track 16 is provided with a plurality of upwardly projecting ratchet teeth 21. Each tooth provides a stop; and, in the illustration there are eight stop positions. However, any suitable number of teeth or stops may be provided. The first stop position, denoted 22, is at the forward end of the control track; and, the last stop position 24 is at the rear end of the track. Return track 18 provides a side wall 25 extending along the teeth 21.

At the forward end of the control track, there is a portion 16a which provides a starting position in front of the first stop 22. At the rear end of the control track there is a portion 16b free of ratchet teeth.

Return track 18 has a smooth arcuate surface interrupted by a diagonal cam surface 26 at its forward end and a downwardly inclined cam face 28 adjacent its rear end. Cam surface 26 is adjacent portion 16a of the control track. The return track also has a rear end portion 18b in the same plane as the portion 16b on the control track.

Mounted on pin 20 and extending along wall 29 of plate 11 is a lever member 30 which projects vertically beyond the tracks 16, 18 and 19. Lever 30 is pivotal on pin 20 and is constantly urged in a clockwise direction from the position shown in Fig. 1, as indicated by the arrow 31. The means biasing lever 30 in such direction is not shown. The lever might be linked to the pickup of a crusher whereby the weight of the pickup would pull the lever in such direction. Pivotal movement of lever 30 in a counterclockwise direction from the position shown in Fig. 1 is against the force indicated by the arrow 31.

Projecting through lever 30 at a point adjacent to but spaced vertically from the tracks of member 15 is a pin 32 on which a control element in the form of a pawl 34 is pivotally mounted. Interposed between the pawl and lever 30 is a spring 35 one end of which is connected to the lever and the other end of which is connected to the pawl to bias the pawl in a clockwise direction when viewed from the side as shown in Fig. 1. The outside diameter of pin 32 relative to the diameter of the bore in pawl 34 through which it projects is such that the pawl is allowed a limited range of cocking movement on the pin. Further it is slidable axially on the pin. When the pawl is on the control track as shown in Figs. 1 and 2, the disposition of spring 35 is such that the lower end of the pawl is urged into engagement with teeth 21 and also laterally and against the side face 25 of return track 18.

Mounted on the same nuts and bolts, 13 and 13', which carry member 15 is a support 36 which extends along the guide track 19 and projects vertically above it. The vertically projecting portion of the carrier plate has an elongate slot 38 concentric with the axis of the pin 20. Mounted on carrier 36 is a deflector 40 of generally U-shaped configuration. Deflector 40 has the bight portion facing toward the forward end of the control track. One leg 41 of the deflector is fastened to carrier 36 by a bolt 42 which extends through slot 38 and has a wing nut 44 threaded on it. Leg 41 has a downwardly extending slot or pocket 45 through which the shaft of bolt 42 projects. It will be apparent, that upon loosening the wing nut 44 the deflector 40 may be moved rearwardly or forwardly on carrier 36.

The other leg 43 of deflector 40 overlies return track 18. While the leg 41 extends generally parallel to the series of tracks, the leg 42 extends diagonally relative to the tracks.

*Operation*

For purposes of illustration, it will be assumed that the structure just described is used to regulate the height of a pickup relative to the ground. The lever 30 is connected to the pickup through a suitable linkage, not shown. When the lever is pivoted counterclockwise from the position shown in Fig. 1 the pickup is raised. The weight of the pickup constantly urges the lever 30 clockwise, as indicated by the arrow 31. Thus, when the lever is released after being pivoted rearwardly it has a tendency to pivot in a clockwise direction so that the pickup will be lowered.

In Fig. 1, pawl 34 is in engagement with the sixth stop position on the eight stop control track 16. By manually, or otherwise pivoting lever 30 counterclockwise, pawl 34 can be set in a seventh or eighth stop position, as desired. If the operator has the pawl at the eighth stop and wishes to reset it to the sixth stop, he pivots lever arm 30 rearwardly until the pawl rides onto the portion 16b of the control track. Once on portion 16b, the pawl is no longer held against lateral movement by side wall 25 of return track 18. Since portion 16b is in the same plane as the portion 18b of return track 18, pawl 34 will be shifted laterally and onto the return track by spring 35. After the pawl has shifted laterally and upon release of the counterclockwise pivoting force, lever 30 will move forwardly or clockwise sliding over the return track 18. In its travel, pawl 34 will first ride up on face 28 of the return track and then along such track until it engages the leg 42 of deflector 40. In view of the diagonal extension of the leg 42 across return track 18, pawl 34 will be cammed laterally and back onto the control track and re-engagement with the sixth stop thereon.

The particular stop engaged by pawl 34 when it is shifted off the return track 18 is determined by the position of deflector 40.

Since deflector 40 prevents pawl 34 from forward movement beyond a given stop on the control track, the pickup will not be dropped all the way down to the lowermost position permitted by the control mechanism when the operator resets pawl 34.

If the operator wishes the lower limit of the control meshanism to be below the sixth stop, he may loosen the wing nut 44 and slide the deflector on the support 36 and along the guide rail 19 to any desired position. When appropriately adjusted, such as to cam pawl 35 into engagement with the second stop (Figs. 3–8) he tightens the wing nut 44 to affix the deflector in place. When the operator resets pawl 34 to a lower position, the pawl will slide on the return track 18 until it engages the deflector as shown in Fig. 5. From that point on it will be cammed laterally as indicated in Fig. 4, against the resistance of the spring 35, finally achieving a position over the control track 16, Fig. 6, whereupon it will drop downwardly and onto the track and into engagement with the appropriate stop thereon, or as illustrated, the second stop.

Preferably leg 42 of deflector 40 has some resiliency whereby the engagement of the pawl with the deflector is cushioned.

It will be noted that slot 45 in the deflector extends from the top edge of leg 41 downwardly. Also, the deflector is disposed over the guide track 19, upon which it may seat. This is done so that if the wing nut 44 becomes loosened because of vibrations or for some other reason, the deflector will merely seat on the guide track instead of falling off and becoming lost.

While the invention has been described in connection with the control of a pickup, it will be understood that it is capable of use in other environments such as to control the operation of a manure spreader or a forage blower. Further, while the invention has been described in connection with a particular embodiment thereof it will be understood that it is capable of further modification and this application is intended to cover any variations, uses or adaptations as come within the spirit of the invention and the scope of the appended claims.

Having thus described my invention, what I claim is:

1. An improvement in a control mechanism having a control track provided with a series of stops thereon, a control element, a member supporting said control element for step movement in one direction over said stops from one end of said control track toward an opposite end thereof, means for shifting said control element at a given point on said control track out of engagement with said control track when the control element is moved toward said opposite end of the control track, and means for shifting said control element back into engagement with a stop of said series of stops as the element is moved in said opposite direction, the improvement residing in said last named means which comprises a support extending along said control track, a deflector mounted on said support and disposed in the path of movement of the control element when the element is moving in said opposite direction, and means for releasably connecting said deflector to said support for selective positioning thereon whereby the particular stop of said series of stops which will be engaged by said control element when the element is shifted by said deflector may be varied.

2. An improvement in a control mechanism having a control track provided with a series of stops thereon, a return track adjacent and parallel to said control track, a control element, a member supporting said control element for step movement in one direction over said stops from one end of said control track to an opposite end thereof, means for shifting said control element at a given point on said control track laterally to said return track when the element is moved toward said opposite end of said control track, and means for shifting said control element back to said control track and engagement with a stop thereon as the element is moved in said opposite direction over said return track, the improvement residing in said last named means which comprises a support extending beside said return track, a deflector mounted on said support and extending over said return track and in the path of movement of said control element when the element is moving in said opposite direction, and means for releasably connecting said deflector to said support for selective positioning thereon whereby the particular stop of said series of stops which will be engaged by said control element when the element is shifted by said deflector may be varied.

3. A control mechanism comprising a control track having a series of stops thereon, a return track adjacent said control track, a guide track adjacent said return track, said tracks extending generally parallel to each other, a control element, a member supporting said control element for step movement in one direction over said stops from one end of said control track toward an opposite end thereof, means for shifting said control element at a given point on said control track laterally to said return track when the element is moved toward said opposite end of said control track, a support extending beside said guide track, a deflector supported on said guide track and projecting over said return track, said deflector being adapted to be engaged by said control element when the element is moved in said opposite direction over said return track to shift the element onto said control track and engagement with a stop thereon, and means for releasably connecting said deflector to said support for selective positioning thereon whereby the particular stop of said series of stops engaged by said control element when the element is shifted by said deflector may be varied.

4. A control mechanism as recited in claim 2 wherein said deflector is generally U-shaped, one leg of which is connected to said support and the other leg of which overlies said return track and provides a deflecting surface.

5. A control mechanism as recited in claim 4 wherein said support has an elongate slot extending in the same direction as said series of stops on said control track and of substantially the same length as the series of stops, said releasable connecting means comprising a bolt projecting transverse to the extension of said tracks through said one leg of said deflector and through said support slot, and a nut threaded onto said bolt.

6. A control mechanism as recited in claim 3 wherein said deflector is generally U-shaped, having one leg connected to said support and another leg overlying said return track and providing a deflecting surface, the open end of said U-shaped deflector facing toward said opposite end of said control track, said one leg having a bottom edge slidable on said guide track and a top edge interrupted by a downwardly extending slot through which a bolt projects for connecting the deflector to said support.

7. A control mechanism as recited in claim 6 wherein the other leg of said deflector is resilient to thereby cushion the deflecting of said control element.

No references cited.